United States Patent Office 3,089,773
Patented May 14, 1963

3,089,773
PREPARED POTATO CONTAINING
CULINARY MIX
Charles J. Bates and Arlee A. Andre, Cincinnati, Ohio, assignors to The Procter & Gamble Company, Cincinnati, Ohio, a corporation of Ohio
No Drawing. Filed May 24, 1961, Ser. No. 120,836
7 Claims. (Cl. 99—94)

This invention relates to a prepared culinary mix, and more specifically, it relates to a composition which is suited to the preparation of a potato patty product.

It has been known to prepare potato patties by frying mashed potatoes on a heated griddle or skillet. As is the case with many other foodstuffs, this product was first prepared as a means for disposing of potatoes which were left over after a meal. However, the flavor and certain aspects of the eating quality of potato patties were so well liked that they are deliberately prepared for use as the potato dish in a meal.

One facet of the eating quality of prior art potato patties which, in the opinion of many, leaves something to be desired is the heaviness and density of the cooked patty. Further, it is inconvenient to peel potatoes, boil and mash them (usually with the addition of milk and butter), and then to use the mashed potatoes as a base for potato patties. After a cook has gone to the trouble to prepare mashed potatoes, the potatoes must then be permitted to cool, shaped into patties of the appropriate size, and cooked on a griddle or skillet. Potato patties are also prepared from partially cooked, riced potatoes, but these require as much handling as those prepared from mashed potatoes, and in addition, it is frequently more difficult properly to rice partially cooked potatoes than it is to mash the fully cooked potatoes.

The precooking step is necessary because raw potato in the form of a patty receives insufficient cooking. If an attempt is made to use raw potatoes, it will be found that the outer portion of the patty is scorched or burned, while the interior is still essentially raw, uncooked potato. A further disadvantage in the use of raw potatoes as a starting point for potato patties is that the mashing or ricing of uncooked potatoes ruptures the cells, rather than merely separating them, and the ruptured cells release large quantities of uncooked starch into the mass. When this starch hydrates during the course of cooking, a sticky, pasty, gummy mass is obtained which is totally unappetizing.

It is an object of this invention to produce a culinary mix from which a light, fluffy potato patty product can be prepared with a minimum of effort.

It is another object of the instant invention to produce a culinary mix, the consistency of which will determine the size and thickness of the potato patty product prepared therefrom so as to obtain a thoroughly cooked product.

Other and further objects of and uses for this invention will readily appear to those skilled in the art after they have read and become familiar with the following description.

The composition of this invention which enables one to prepare a potato patty product by the operation of merely adding water or other appropriate liquids, stirring into a batter, and ladling onto a heated surface comprises a flour component in which the characteristics are balanced to obtain the proper eating quality, a dried potato component properly balanced to obtain the necessary batter consistency, and a leavening system. While the foregoing ingredients constitute the basic mix and could be sold as such for use by the consumer who would add his own flavoring ingredients, it is desirable that flavoring components, such as sugar and/or salt, be present so as to achieve the maxium ease of use and obviate any blending of dry solids with the mix of the present invention. It is also possible to enhance the flavor with a material such as dried onions, or to completely change the character of the product by adding barbecue flavoring, meat flavoring, or even particles of dehydrated meats, vegetables, and so on.

The flour component required consists of a combination of hard and soft wheat flours. If the wrong proportion of flours is used, the desired texture in the finished product will not be obtained. If the flour component contains too much hard flour, the structure will be rather tough and doughy. The product will have a quality of "springiness" rather than the desired tenderness. If a flour is used which is too soft, the finished patty will be moist and soggy. It will also lack sufficient strength to hold its shape.

The foregoing considerations require that a combination of a hard wheat flour and a soft wheat flour be used in the correct proportions. The ratio of soft wheat flour to hard wheat flour may be varied in a range from about 8 to 1 to about 1 to 2, while still maintaining satisfactory product eating quality. The preferred ratio of soft wheat flour to hard wheat flour is from about 4:1 to about 1:1, with an optimum apparent at about 2:1.

The hard wheat flour contemplated for use in the instant invention can be characterized more specifically as an all-purpose patent hard wheat flour. Such a flour will contain about 9.5 to about 11 percent protein and will have a viscosity, as determined by the American Association of Cereal Chemists' test method 97.1, of about 100° to about 150°. The soft wheat flour is more specifically characterized as a straight grade soft wheat flour. It will have a protein content of from about 8 to about 9 percent and a viscosity of about 40° to about 60°.

The flour component is the ingredient which in conjunction with the leavening system produces the required lightness in the finished patty product. In general, the amount of flour present will range from about 25% to about 65% by weight of the total composition. Preferably, the weight of the flour component will lie between about 40% and about 55% by weight of the total composition.

It has been found that if the consistency of the batter prepared from the product of this invention is too thin, the batter will spread over the griddle, cook through rapidly, and dry out so that a dry, brittle, unappetizing products is obtained. If on the other hand, the batter is extremely stiff so that it sets up and will not flow over the griddle, a thick product is obtained which, even though adequately browned on the exterior, will be found to be essentially cold and uncooked in its interior. The constituent largely determinative of batter consistency is the dried potato component.

All dried potatoes are rehydratable in hot water, that is, water at a temperature of 150° F. up to the boiling point. All dried potatoes are not, however, rehydratable in cold water. To obtain proper batter consistency a mixture of dried potato which does not rehydrate in cold water (hereinafter referred to as "non-cold water-rehydratable dried potato") and dried potato which will rehydrate in cold water (hereinafter referred to as "cold water-rehydratable dried potato") is required. The cold water-rehydratability of dried potato is readily ascertained by a simple test: The dried potato is mixed with an amount of water sufficient to restore it to its approximate original water content. For example, 40 g. of the dried potato to be tested is placed in a 250 ml. beaker. Cold water, i.e., with a temperature between about 60° F. and about 90° F., in the amount of 160 g. is added to the dried potato and the mixture is stirred for a short time, such as 10 to 30 seconds. A cold water-rehydratable dried potato will set up into a firm mass with the appearance of mashed potatoes in a short time, generally less than five minutes. On the other hand, the non-cold water-rehydratable dried potato will merely form a thin slurry in the container, and generally, will settle to form an opaque layer which contains a high proportion of unrehydrated potato and an upper layer which is only slightly turbid and contains very little potato solids. This mixture can be allowed to set for an hour, a day, or longer, and it will still remain in the form of a thin slurry, the consistency of which will not be much different from that of water.

To obtain the necessary batter consistency to be useful in this invention, the ratio of non-cold water-rehydratable dried potato to cold water-rehydratable dried potato should be in the range from 1:7 to 1:1, and preferably between about 1:6 and about 1:3.

The amount of dried potato component present may be varied from about 25% to about 65%, preferably about 30% to about 45%. If too little dried potato component is used, the finished patty loses its potato character and flavor and becomes bread-like in texture. If too much dried potato is used, the product loses its light, fluffy texture and becomes dense.

To aid in obtaining lightness and fluffiness in the product produced from the culinary mix of the instant invention, a leavening system is used. As is known in the art, some leavening acids mixed with soda or other carbon dioxide-producing material produce large quantities of gas at room temperatures. Other leavening acids do not produce quantities of gas until baking temperatures (anywhere from 200°-400° F.) are reached. The combination of sodium bicarbonate (baking soda) and a leavening acid which causes said soda to generate large quantities of carbon dioxide at room temperature is known as a "fast-acting" leavening system, and the combination of soda with a leavening acid which causes said soda to release carbon dioxide in quantity only at high temperatures is known as a "slow-acting" leavening system.

The leavening system of this invention should produce some gas as the batter is mixed to facilitate blending of the ingredients and to achieve some flow properties in the batter. The leavening system should also provide gas during the cooking operation to maintain a light, open structure. For this reason it is preferred to use a leavening system which combines features of both the fast- and slow-acting leavening systems. Such a combined leavening system is well-known in the art as a "double-acting" leavening system because it acts both in the batter and during the cooking operation. From about 2 to about 4.5 percent by weight of a leavening system has been found to give the desired results.

A suitable combination of leavening acids is chosen so that one produces hydrogen ions in solution at room temperature and the other does not begin to produce hydrogen ions until elevated toward the final cooking temperature. The hydrogen ions so produced react with the soda to liberate carbon dioxide gas. Examples of slow-acting leavening acids which may be used are the coated or hardened anhydrous monocalcium phosphates, slow-dissolving sodium acid pyrophosphates, and sodium aluminum phosphates. Examples of fast-acting leavening acids are monocalcium phosphate monohydrate, fast-dissolving sodium acid pyrophosphates, tartaric acid, and potassium acid tartrates. Other suitable leavening systems of the double-acting type are familiar to those skilled in the art. The acids are proportioned so that from about 35% to about 65% of the leavening gas is released at low temperatures and the remainder is released at high temperature. Preferably, approximately equal amounts of leavening gas are released during the mixing operation and during the cooking.

While the forecited components determine the basic characteristics of the mix and the patties prepared therefrom, the product is improved by the addition of auxiliary ingredients for flavoring or other purposes. It has been found helpful to add sucrose as a flavoring ingredient at a level of from 1½ to about 4½% by weight of the mix composition. Sucrose also aids in producing a golden brown color in the fried patty. Salt at a level of from about 2% to about 5% may be used for flavoring. For a low-sodium content product the salt should, of course, be omitted.

While salt and sucrose are generally used basic flavoring ingredients, other ingredients may be used to impart a positive flavor to the patties or to accentuate and highlight some of the flavors already present. For instance, dried onion may be present in the amount of from about 0.3% to about 1.5% by weight of the mix. The use of about ½% by weight of dried onion has been found to produce a flavor which is well-liked by a large proportion of persons. Spicier flavors, meat flavors, cheese, or other flavors to change the basic potato flavor characteristic of the product may also be added.

The following Examples will serve to illustrate the practice of this invention with greater particularity.

*Example I*

The following product was prepared:

| | Percent by weight |
|---|---|
| Straight-grade soft wheat flour (average protein, 8.8%) | 19.90 |
| All-purpose hard winter wheat flour (average protein, 10.7%) | 8.00 |
| Cold water-rehydratable dried potato (flakes prepared by the process of U.S.P. 2,780,552) | 48.00 |
| Non-cold water-rehydratable dried potato (granules prepared by the "add-back" process [1]) | 12.00 |
| Sucrose | 3.54 |
| Fast-acting monocalcium phosphate-monohydrate (12XX produced by Victor Chemical Co.) | 1.13 |
| Slow-acting coated anhydrous monocalcium phosphate (V-90 produced by Victor Chemical Co.) | 1.13 |
| Sodium bicarbonate | 1.80 |
| Salt | 3.00 |
| Dried onion | 1.50 |

[1] Exemplified in 6 Advances in Food Research 231, 238.

The flour, potato granules, sucrose, phosphates, soda, salt, and onion were blended in an upright planetary mixer. After the ingredients were thoroughly blended, they were placed in a ribbon mixer, the potato flakes were added, and blending was continued just long enough to incorporate the flakes homogeneously through the batch.

Sixty-eight grams of the mix was commingled with 140 g. of water and stirred until the ingredients were evenly blended to form a batter. One-quarter cup of batter was ladled onto a greased griddle, said griddle being maintained at medium heat (380° F.). The pattty was cooked for about 1½ minutes until golden brown and then turned over and cooked for a like period to produce a golden brown color on the other side. The patty was light and fluffy, with a tender eating quality and pleasant potato flavor.

It will be noted that the flakes used in the above example were added last, after the other ingredients were blended. This is to minimize fracture of the flakes with the consequent release of starch from ruptured cells. As is known to those skilled in the art, the fracturing of potato flakes will tend to cause poor performance due to the aforementioned release of starch and the resultant sticky and gummy character of the rehydrated material.

In preparing the mix for cooking, water is added in an amount equal to between about 1.9 and about 2.4 times the weight of the mix. The liquid used in constituting the batter may be milk or egg and milk. A richer patty product is produced if milk and an egg are used in preparation of the batter.

Illustrative of the constitution of the mixes of this invention with milk and eggs are the following examples:

| Ingredient | Example II | Example III | Example IV | Example V |
|---|---|---|---|---|
| Soft wheat flour | 35.00 | 20.00 | 38.00 | 41.00 |
| Hard wheat flour | 16.00 | 9.00 | 19.00 | 10.00 |
| Cold water-rehydratable dried potato | 30.40 | 35.00 | 26.00 | 25.00 |
| Non,cold water-rehydratable dried potato | 7.60 | 25.00 | 4.00 | 13.00 |
| Sucrose | 3.54 | 3.54 | 3.54 | 3.54 |
| Fast-acting monocalcium phosphatemonohydrate | 1.13 | 1.13 | 1.13 | 1.13 |
| Slow-acting coated monocalcium phosphate | 1.13 | 1.13 | 1.13 | 1.13 |
| Soda | 1.80 | 1.80 | 1.80 | 1.80 |
| Salt | 3.00 | 3.00 | 5.00 | 2.00 |
| Dried onion | 0.40 | 0.40 | 0.40 | 1.40 |

NOTE.—All of the ingredient quantities are given in percent by weight

Each of the mixes of Examples II though V was prepared in the same manner as that of Example I. Each mix was made into a batter by adding 120 g. of skim milk and one egg to 69 g. of the mix. The batter was mixed and cooked at 380° F. as in Example I. Each of Examples II through V produced a patty which was tender and golden brown. Example V produced a patty with a moderate to strong onion flavor and the remainder produced a potato-flavored patty with a slight onion note.

The milk and/or egg may also be incorporated directly into the mix so that the flavor qualities produced by these materials may be obtained without requiring the user to have milk and/or eggs on hand. The following Example is illustrative of this practice.

*Example VI*

Percent by weight
Soft wheat flour _____ 25.30
Hard wheat flour _____ 11.60
Cold water-rehydratable dried potato _____ 22.00
Non-cold water-rehydratable dried potato _____ 5.50
Sucrose _____ 2.58
Fast-acting monocalcium phosphate _____ 0.82
Slow-acting monocalcium phosphate _____ 0.82
Soda _____ 1.30
Salt _____ 2.17
Onion _____ 0.30
Non-fat dry milk solids _____ 11.71
Dried whole egg-solids _____ 15.90

The ingredients are blended as they were in Example I. The batter for the above example is prepared by adding 142 g. of water to 94 g. of the mix. A light, fluffy, golden brown patty is produced by this mix.

As has been hereinabove disclosed, ingredients may be added to change the potato-like nature of the finished patty. The following examples are further illustrative of this practice.

| Ingredient | Example VII | Example VIII |
|---|---|---|
| Soft wheat flour | 29.22 | 26.22 |
| Hard wheat flour | 12.00 | 12.00 |
| Cold water-rehydratable dried potato | 28.00 | 30.00 |
| Non-cold water-rehydratable dried potato | 4.00 | 6.00 |
| Soda | 1.50 | 1.50 |
| Fast-acting monocalcium phosphate | 0.94 | 0.94 |
| Slow-acting monocalcium phosphate | 0.94 | 0.94 |
| Salt | 1.95 | 1.90 |
| French-fried pork rinds | 18.00 | |
| Smoke flavoring | 0.50 | |
| Sugar | 2.95 | 2.95 |
| Dried onion | | 1.25 |
| Green and red dried sweet pepper | | 16.00 |
| Red pepper | | 0.30 |

NOTE—All of the amounts shown are in percent by weight.

The mixes of Examples VII and VIII each produce a golden brown, light, fluffy patty. The "bacon patty" produced from the culinary mix of Example VII is interesting in that people who have eaten it consider that it could by itself be the main course of a meal. Comparable results are obtained in the above examples when slow-dissolving sodium acid pyrophosphates or sodium aluminum phosphates are used as the slow-acting leavening acids and fast-dissolving sodium acid pyrophosphates, tartaric acid, or potassium acid tartrates are used as the fast-acting leavening acids.

The invention having been described in clear and concise terms, what is claimed is:

1. A culinary mix composition for the preparation of potato patties which comprises from about 25% to about 65% by weight of a flour component containing a soft wheat flour and a hard wheat flour in the ratio of from about 8:1 to about 1:2; from about 25% to about 65% by weight of a potato component consisting of a non-cold water-rehydratable dried potato and a cold water-rehydratable dried potato in the ratio of from about 1:7 to about 1:1; and a double-acting leavening system.

2. A culinary mix composition for the preparation of a potato patty product whch comprises from about 40% to about 55% by weight of a flour component containing soft wheat flour and hard wheat flour in the ratio of from about 8:1 to about 1:2; from about 30 to about 45% by weight of a potato component consisting of a non-cold water-rehydratable dried potato and a cold water-rehydratable dried potato in the ratio of from about 1:7 to about 1:1; and a double-acting leavening system.

3. A culinary mix composition for the preparation of a potato patty product which comprises from about 25% to about 65% by weight of a flour component containing soft wheat flour and hard wheat flour in the ratio of from about 4:1, to about 1:1, from about 25% to about 65% by weight of a potato component consisting of a non-cold water-rehydratable dried potato and a cold water-rehydratable dried potato in the ratio of from about 1:6 to about 1:3; and a double-acting leavening system.

4. A culinary mix composition for the preparation of a potato patty product which comprises from about 40% to about 55% by weight of a flour component containing soft wheat flour and hard wheat flour in the ratio of from about 4:1 to about 1:1; from about 30% to about 45% by weight of a potato component consisting of a non-cold water-rehydratable dried potato and a cold water-rehydratable dried potato in the ratio of from about 1:6 to about 1:3; and a double-acting leavening system.

5. A culinary mix composition for the preparation of a potato patty product which comprises from about 40% to about 55% by weight of a flour component containing soft wheat flour and hard wheat flour in the ratio of about 2:1; from about 30% to about 45% by weight of a potato component consisting of a non-cold water-rehydratable dried potato and a cold water-rehydratable dried potato in the ratio of from about 1:6 to about 1:3; and a double-acting leavening system.

6. A culinary mix composition for the preparation of a potato patty product which comprises from about 40% to about 55% by weight of a flour component containing soft wheat flour and hard wheat flour in the ratio of from about 4:1 to about 1:1; from about 30 to about 45% by weight of a potato component consisting of a non-cold water-rehydratable dried potato and a cold water-rehydratable dried potato in the ratio of from about 1:6 to about 1:3; from about 1½% to about 4½% by weight of sucrose; from about 2% to about 5% by weight of salt; and a double-acting leavening system.

7. As a culinary mix composition for the preparation of a potato patty product, the following components in admixture:

| | Percent by weight |
|---|---|
| Soft wheat flour | 34 to 36 |
| Hard wheat flour | 15 to 17 |
| Potato flakes | 28 to 32 |
| Potato granules | 5 to 9 |
| Sucrose | 2 to 5 |
| Fast-acting leavening acid | 1 to 1.3 |
| Slow-acting leavening acid | 1 to 1.3 |
| Sodium bicarbonate | 1.5 to 2.0 |
| Salt | 2 to 4 |
| Dried onion | 0.3–0.5 |

References Cited in the file of this patent

"Potato Processing," 1959, by Talburt et al., The Avi Pub. Co., Inc. (Westport, Conn., pp. 445 and 446).

"Meta Given's Modern Encylopedia of Cooking," vol. II, 1949, J. G. Ferguson and Associates (Chicago), p. 1500.